July 4, 1950  J. E. CHENETTE  2,514,120
DEVICE FOR SPLITTING AND PITTING PEACHES
Filed July 12, 1948  2 Sheets-Sheet 1

Inventor
JOHN E. CHENETTE.
By Arnold and Mathis
Attorney

Patented July 4, 1950

2,514,120

UNITED STATES PATENT OFFICE 2,514,120

DEVICE FOR SPLITTING AND PITTING PEACHES

John E. Chenette, Wenatchee, Wash., assignor to Wenatchee Foods Incorporated, Wenatchee, Wash., a corporation of Washington Application July 12, 1948, Serial No. 38,293

4 Claims. (Cl. 146—28)

My invention relates to a peach splitter. More particularly my invention relates to a device into which a peach is guided through the knife means and split to remove the pit from one of the halves.

In describing my invention, the same will be described in connection with Freestone peaches, as my device is particularly useful in such field, as such a peach can be split and the pit removed from one of the halves during the same operation.

The difficulties in prior art commercial peach splitters are that the cutting blades in some machines fail to consistently follow completely around the pit, and thus the grade yield was low because of the failure to have a clean severance between the pit and the halves. Other prior art machines required a complete twisting of the fruit during pitting, and with an increased labor problem because of the extra effort required in splitting the peaches. Other prior art machines were operable only on Clingstone peaches and are not applicable to the softer texture of Freestone peaches.

It is an object of my invention to overcome the defects of the prior art machines and to provide a device which is simple to operate and with a minimum effort on the part of the operators.

It is a further object of my invention to provide a device having spaced apart fixed cutters which converge in combination with movable cutters which will follow the contour of the peach pit. This provides for the maximum cutting to be done by the fixed cutters and permits spring loaded cutters, which follow the pit, to be more precise in operation and to require less spring tension, which makes for ease and accuracy of operation.

All peach splitting knives must be sharpened at frequent intervals, and for this reason there is much wear. My device provides a construction so that the knives are relatively adjustably movable toward and away from each other, and thus, as the knives are ground, they can be readily set to maintain a predetermined desired adjustment. It is a further object of my invention to provide a peach splitter which is simple in design and rigid in construction. It is a further object of my invention to provide a peach splitter which does not require skilful operators. In prior art splitters, it often required a season for an operator to become adept in the operation of the peach splitter.

The above-mentioned general objects of my invention, together with others inherent in the same, are attained by the device illustrated in the accompanying drawings.

Figure 1:
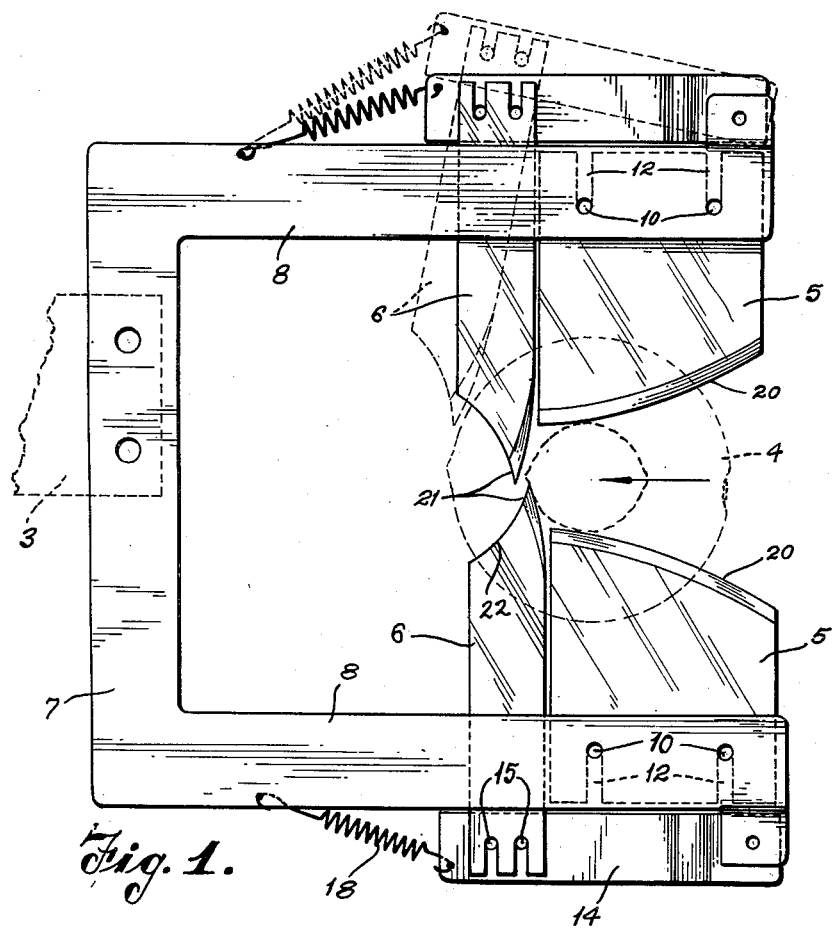
Figure 1 is a view in side elevation of a peach splitter embodying my invention and illustrating a peach in connection with the same (certain cap screws being omitted in the interest of clarity)
Figure 2:
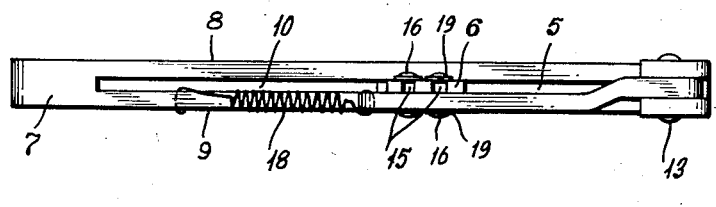
Fig. 2 is a bottom plan view of the construction shown in Fig. 1.
Figure 3:
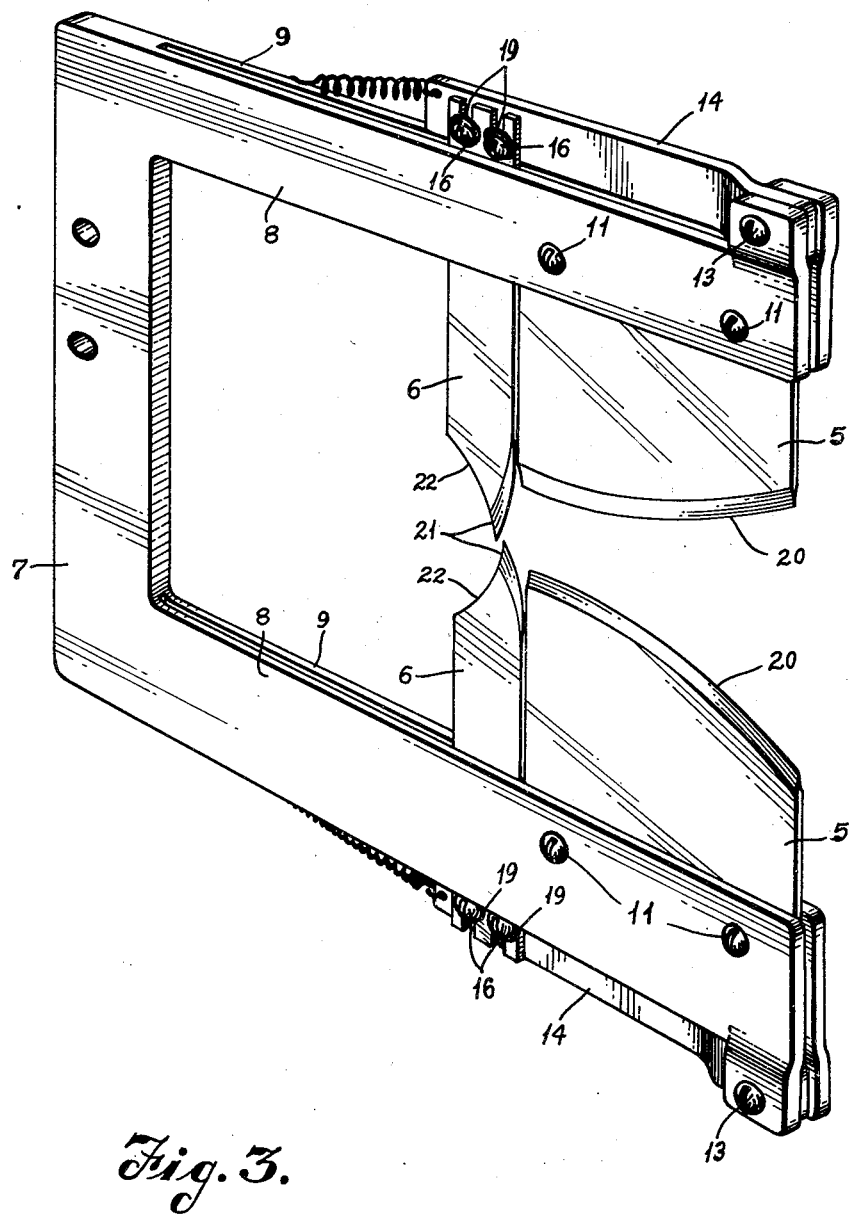
Fig. 3 is a perspective view of the construction shown in Fig. 1.

A frame 3 indicates any means of suitable support to hold the device at the desired working level. As will be hereinafter explained, an operator manually moves a peach 4, between spaced, vertically alined, fixed cutting blades 5 and between spaced, vertically alined, movable cutting blades 6, and hence the level at which the device is supported by frame 3 will be determined by the requirements of a particular operator. The frame 3 supports a U-shaped bracket 7. The U-shaped bracket 7 preferably has its legs formed by spaced members 8 and 9 with a space 10 therebetween. The members 8 and 9 are provided with alined openings 10 and preferably the openings in one of the members are threaded to receive cap screws 11. The cutters 5 are provided with slots 12. Upon loosening of cap screws 11, the cutters or blades 5 are adjusted relative to each other and then the cap screws 11 are tightened and urge the members 8 and 9 relatively toward each other and fix any desired position of the cutter 5 which is being adjusted. The legs 8 and 9 each carry pivot means 13 which is preferably a removable pivot and plate 14 is pivotally supported thereby. The plate 14 is provided with holes 15 which are threaded to receive cap screws 16. The movable cutters 6 are provided with slots 17. Thus, cap screws 16 may be loosened and a cutter 6 adjusted relative to the plate 14, and then the cap screws 16 tightened to hold any desired adjustment. Spring means 18 resiliently urge the plate 14 toward the leg members 8 and 9. Stop means are provided to limit upward movement of the plate 14 toward the leg members 8 and 9, and this may be in the nature of offsetting plate 14 intermediate its length so that plate 14 strikes leg member 9 while movable cutters 6 may be reciprocated in the opening 10.

The blades 5 are preferably symmetrically positioned, as shown, so that their cutting edges have uniform operation in cutting a peach 4 that is urged between them. The cutters 5 have their cutting edges converging, and the minimum distance between them is sufficient to permit the largest pits to be split to pass between them. The movable cutter blades 6 are preferably alined so that one thereof, such as the lower one as indicated in Fig. 1, commences its cut in advance of the other movable cutter. This serves as a lead which makes splitting easier because both springs 18 are not engaged precisely at the same time.

The cutting edges of the fixed cutters 5 are numbered 20 while the cutting edges of the movable cutter blades 6 are numbered 21.

In operation, an operator urges a peach with the pit positioned so that the long axis thereof is substantially in a horizontal plane as shown. The cutters 5 do the major portion of the cutting. The peach as it progresses between cutters 5 encounters the lower movable cutter blade 6 and it starts to cut. Next, the peach encounters the lower cutter 6 and movable cutters 6 remain relatively fixed until cutting edge 21 of the lower cutter blade 6 encounters the peach pit and it starts to move about its pivot means 13. Then the upper cutter edge 21 encounters the peach pit and tends to move about its pivot means 13. The points of the cutters 6 follow a path around the peach pit until they get to the widest dimension of the short axis thereof. Then the movable cutters 6 are urged inwardly by reason of the springs 18 and the arcuate surfaces 22 permit the points of the cutter edge 21 to follow the trailing surface of the pit and to completely sever the pit from the peach. The cutting edges 21 are convex and the arcuate surfaces 22 are concave. The degree of curvature of the surfaces 22 must be sufficient so that they will permit the cutting point of the cutter edges 21 to closely follow the largest pits which are to be encountered during normal splitting.

After the peach has been completely split, the operator gives the peach halves a slight twist, about a horizontal axis lying in the plane of cutters 5 and 6, and the peach pit is separated from one of the halves—the said peach halves being twisted relatively in opposite directions.

The spring tension of springs 18 need not be as great as it would be if I did not have fixed cutters 5 as the work they do need not be done by the movable cutter blades 6. This lessening of spring tension means less work for the operator and less pressure on the fruit. Obviously, the more pressure there is on the fruit, the greater is the chance of damage to the fruit. Also, as there are no knife points which can engage the pit at the time that the fruit is being twisted to loosen the pit from one of the halves, there can be no damage to the pit cavity as the pits cannot stick to the knife. Any damage to the fruit cavity brings a lower grade yield.

The devices embodying my invention may be very simple in construction and need not be bulky. The height and length of a device embodying my invention need only be a matter of inches, such as 11". Also, the only wearing parts of my invention will be the pivot means which are removable and the blades 5 and 6 which may be removed, sharpened, and adjusted for any wear.

Obviously, changes may be made in the forms, dimensions, and arrangement of the parts of my invention, without departing from the principle thereof, the above setting forth only a preferred form of embodiment.

I claim:

1. A peach splitter comprising a U-shaped bracket; two vertically alined, spaced, fixed cutter blades detachably connected with the legs of said U-shaped bracket, said cutter blades having arcuate-shaped convex cutting surfaces disposed to provide a converging opening therebetween; a plate pivotally connected with each leg of said U-shaped bracket; two vertically alined, spaced, movable cutter blades each detachably connected with one of said plate members, said movable cutter blades each having an arcuate-shaped convex cutting surface and with one thereof disposed to cut in advance of the other, each of said movable cutter blades having an arcuate-shaped concave edge trailing its cutting point; and resilient means urging said cutter blades toward and into close proximity with each other.

2. A peach splitter comprising two vertically aligned, spaced, fixed, converging cutter blades for initially cutting a peach to two parallel lines of cutting; and two vertically aligned, spaced, movable cutter blades cutting subsequently to said fixed cutter, said movable cutter blades comprising cutter blades movable toward and away from each other by a resilient means urging the blades normally in close proximity to each other, said movable cutter blades each having an arcuate shaped convex cutting surface terminating in a cutter point at its advance edge and an arcuate concave trailing edge terminating at said cutter point, all of said cutter blades aligned to split in a common plane a peach relatively urged therepast and with the said cutter points following the surface of the peach pit.

3. A manually operable freestone peach splitter comprising two aligned, spaced, fixed, converging cutter blades for initially cutting a peach to two parallel lines of cutting clear of the pit thereof; and two aligned, spaced, movable cutter blades cutting subsequently to said fixed cutters, in the same lines of cutting as said fixed cutters and completing the cut of the fixed cutters to and around the pit of the peach, said movable cutter blades comprising pointed cutter blades movable toward and away from each other by a resilient means urging the blades normally to substantially a common line of cutting, said movable cutter blades each having a cutting point, all of said cutter blades aligned to split in a common plane a peach relatively urged therepast and with the said fixed cutters providing initial cuts to parallel lines of cutting clear of the pit of the peach and the movable cutter points completing the cut of the peach to and around the pit.

4. A manually operable freestone peach splitter comprising two aligned, spaced, fixed, converging cutter blades for initially cutting a peach to two parallel lines of cutting clear of the pit thereof; and two aligned, spaced, movable cutter blades cutting subsequently to said fixed cutters, in the same lines of cutting as said fixed cutters and completing the cut of the fixed cutters to and around the pit of the peach, said movable cutter blades comprising cutter blades movable toward and away from each other by a resilient means urging the blades normally to substantially a common line of cutting, said movable cutter blades each having a cutter point and one starting to cut in advance of the other, all of said cutter blades aligned to split in a common plane a peach relatively urged therepast and with said fixed cutters providing initial cuts to parallel lines of cutting clear of the pit of the peach and the movable cutter points completing the cut of the peach to and around the pit.

JOHN E. CHENETTE.

REFERENCES CITED

The following references are of record in the file of this patent:

UNITED STATES PATENTS

| Number | Name | Date |
|---|---|---|
| 484,995 | Burns | Oct. 25, 1892 |
| 1,529,127 | Haller | Mar. 10, 1925 |
| 1,605,614 | Reynolds | Nov. 2, 1926 |
| 1,785,002 | Duncan | Dec. 16, 1930 |
| 2,196,617 | Thornton | Apr. 9, 1940 |